(12) United States Patent
Woods et al.

(10) Patent No.: US 10,335,725 B2
(45) Date of Patent: Jul. 2, 2019

(54) TOOL-LESS FILTRATION ASSEMBLY

(71) Applicant: AMERICAIR CORPORATION, Mississauga (CA)

(72) Inventors: Jim Woods, Mississauga (CA); Adam Douglas Marchand, Lindsay (CA)

(73) Assignee: AMERICAIR CORPORATION, Mississauga (CA)

( * ) Notice: Subject to any disclaimer, the term of this patent is extended or adjusted under 35 U.S.C. 154(b) by 229 days.

(21) Appl. No.: 15/581,628

(22) Filed: Apr. 28, 2017

(65) Prior Publication Data

US 2018/0311602 A1 Nov. 1, 2018

(51) Int. Cl.
*B01D 53/02* (2006.01)
*B01D 46/00* (2006.01)
*B01D 46/24* (2006.01)

(52) U.S. Cl.
CPC ..... *B01D 46/0005* (2013.01); *B01D 46/0002* (2013.01); *B01D 46/2411* (2013.01); *B01D 2265/028* (2013.01); *B01D 2271/02* (2013.01)

(58) Field of Classification Search
CPC .......... B01D 2265/028; B01D 2271/02; B01D 46/0002; B01D 46/0005; B01D 46/2411
See application file for complete search history.

(56) References Cited

U.S. PATENT DOCUMENTS

| 3,966,442 | A | * | 6/1976 | Waters | A24F 19/0042 96/132 |
| 5,792,427 | A | * | 8/1998 | Hugh | C12M 23/48 219/407 |
| 6,494,940 | B1 | * | 12/2002 | Hak | A61L 9/16 55/471 |
| 9,359,982 | B2 | * | 6/2016 | Oh | B01D 46/0002 |
| 9,700,823 | B2 | * | 7/2017 | Stoner, Jr. | B01D 46/001 |
| 2002/0173265 | A1 | * | 11/2002 | Kipka | H05K 7/20181 454/184 |
| 2014/0150488 | A1 | * | 6/2014 | Black | F24F 3/14 62/404 |
| 2015/0113924 | A1 | | 4/2015 | Matthews | |
| 2016/0074801 | A1 | * | 3/2016 | Francis | B01D 46/2411 55/485 |

* cited by examiner

*Primary Examiner* — Christopher P Jones
(74) *Attorney, Agent, or Firm* — Roach Brown McCarthy & Gruber, P.C.; Kevin D. McCarthy (57) ABSTRACT

A tool-less air filtration device having a two-piece housing with a filter. The tool-less air filtration device is simple, is totally tool-less for removing and replacing HEPA air filters and cleaning the interior of the air filtration device, and allows for quick, seamless filter changes in the field, while providing the convenient accessibility required to fully clean all surfaces of the unit.

5 Claims, 11 Drawing Sheets

TOOL-LESS FILTRATION ASSEMBLY

FIELD OF THE INVENTION

The present invention relates to a tool-less filtration assembly.

BACKGROUND OF THE INVENTION

Filter Assembly

At U.S. published application number 20150113924; Mathews et al. wrote in the abstract, "A stackable, portable air filtration unit utilizing a molded plastic central housing, injection-molded plastic inlet and outlet covers and accommodating a high-efficiency particulate air ("HEPA") filter or other high efficiency particulate filter, a secondary filter and a pre-filter. The unit is versatile and flexible in that different motorized impellers can be used alternatively, depending on the desired specifications." Mathews et al. also expressed that their portable air filtration unit has a housing with a carrying handle, a sloping control panel and an air exhaust. To the left of the housing are a venturi ring, a high-efficiency filter, high-efficiency filter securing brackets, a secondary filter, a pre-filter and an inlet door. To the right of the housing may be seen a motorized impeller, a motor mount, an outlet cover, a control panel box and a control panel assembly, which includes a control panel. When these components are assembled, the inlet door permits entry of unfiltered air through inlet, which is drawn in and through the pre-filter, the secondary filter and the high-efficiency filter by the motorized impeller. When closed, the inlet door secures the pre-filter and the secondary filters in their appropriate places and seals against housing with a latch and keeper, one side of which is attached to the housing and the other side of which is attached to the inlet door. A pair of hinges on the opposite side affix the door to the housing. This sealing engagement between the inlet door and the housing assures that air drawn into housing must pass through the three filters. This sealing engagement calls for the door, when opened, to have the pre-filter seated in a like-shaped cavity on the inner side of inlet door. This customized cavity inhibits any significant air flow to bypass pre-filter as can happen with some air filtration units. The pre-filter is surrounded by a raised boss, contoured to match the filter side recess in housing, which is generally rectangular and has two tabs extending up and two tabs extending down from the rectangular portion of the raised boss. The housing has a generally rectangular recess with upward facing and downward facing tab-receiving recesses. Opposed pairs of the recesses in housing receive the two ends of the high-efficiency filter securing brackets. The brackets may be sections of square or rectangular cross-section tubing, channel, such as C-shaped, L-shaped or other cross-section channel, or a wide variety of other elongated structures including a metal strap, a rod or a bar stock. The recesses extend into the housing so that the brackets are fully seated in pairs of recesses hold the high-efficiency filter in its intended position in the housing and may be secured, among other ways, by screws, pins, bolts or other fasteners that pass through bracket ends and into housing or into suitable fittings attached to housing such as threaded metal inserts.

As explicitly acknowledged by Mathews et al., its filter assembly requires tools to remove the high-efficiency filter from or attach the filter to the filter assembly. Those tools along with the conventional fasteners are utilized to obtain an air-tight (with the understanding that air-tight permits air to enter into and escape from the filter assembly at designated apertures) and leak-proof environment in the filter assembly. The present invention is directed to avoid the use of tools to change the high efficiency filter in a filter assembly, clean the interior of the filter assembly, and also ensure the air filtration system receives air intended to be filtered through a HEPA air filter in an air-tight, leak-proof environment.

Similarly, Americair, Inc., the assignee of this application, is the manufacturer of its AIRWASH HEPA air filtration system which has a housing. The housing has an air inlet and an air outlet, and within the housing is a fan/motor and a HEPA filtration system. The fan/motor draws air through (a) the air inlet which can have a pre-filter apparatus, (b) a foam pre-filter that removes larger particulates such as dust and dander, (c) a high efficiency particulate removal filter media that is laser tested to remove 99.97% of the particles in the air stream down to a size of 0.3 microns—particles of concern which are normally in this size range include pollen, household dust, cigarette smoke, bacteria, molds, etc.; (d) an inner blanket (which can be like ½ inch) of activated carbon impregnated with non-woven polyester filter material which absorbs additional gaseous contaminants such as odors and toxic fumes; and (e) the air outlet.

Everything defined immediately above is generically a component in the instant invention—(1) a housing having an air inlet and an air outlet, (2) a fan/motor device that pulls or pushes air though the housing and a HEPA air filter, and (3) the HEPA air filter system that cleans the air as described in items (a) to (d) immediately above.

In particular the AIRWASH air filtration system can cleanse up to 1,000 cubic feet of air per minute. The applicant conducted a particulate study that compared the number of particulates in a 15'×30' room prior to operating its AIRWASH air filtration system (referred to as "Ambient Room") and after its AIRWASH air filtration system operated for 20 minutes (referred to as "20 min Operating"), wherein the particle reader, identified above, was positioned on a conventional end table in the middle of the room. The results are as follows:

| Condition | Particle Count |
| --- | --- |
| Ambient Room | 297,400 |
| 20 min Operating | 166,400 |

HEPA Filter

Americair Corporation manufactures numerous types of air filtration devices and filters, in particular HEPA air filtration devices and filters. Its HEPA air filtration devices are large, medium and small devices that utilize corresponding sized filters. Its filtration devices, like Mathews et al.'s filtration assembly, require tools to insert and replace HEPA filters. Americair also manufactures a threaded HEPA filter having an EasyTwist brand threaded end cap.

That threaded HEPA filter has a threaded end cap at one end, a HEPA filter section and a second end cap at the other end. The threaded end cap has an aperture, essentially positioned in the center of the threaded end cap, with a wall extending in a direction toward the second end cap. The wall has the threaded area of the threaded end cap.

The threaded area releasably engages with a corresponding threaded protrusion of an air filtration device's bulkhead in or on its air filtration system. In one embodiment, a filter o-ring is positioned around the threaded protrusion, thereby the o-ring creates an air-tight seal between the threaded end cap and the bulkhead when the two components are properly positioned together. That air-tight seal is designed to inhibit air in the air filtration device from bypassing the filter.

The bulkhead, preferably, has an opening within an area defined by or encircling the threaded protrusion. That bulkhead opening directs air into or out of the HEPA air filter and/or the air outlet, depending on the air flow's direction, to obtain the desired air quality after the air passes through the HEPA air filter.

Americair's threaded HEPA air filter has the following characteristics:

Cylindrical Perfect Seal 2-Stage Cartridge (13" Diameter×16" Height)

Stage One: ⅛" Foam Prefilter

Stage Two: Granulated Carbon pellets encased in steel mesh canister (9475 g=10,422,500 m² adsorption surface area)

Optional Stage Two: 100 sq. ft. Pleated Easy Twist HEPA Cartridge

Optional Stage Three: Granulated Carbon pellets encased in steel mesh canister (1550 g=1,705,000 m² adsorption surface area)

In its manuals that describe how to install the threaded HEPA filter in an Amaircare® brand air filtration device, Americair wrote, "With the filters changed or inspected, all 3 filters are ready to be placed back into the unit. Place the HEPA cartridge gently into the unit (if a carbon canister is being used, take care not to let it slide out as it is heavy and could damage the unit.) When the HEPA cartridge is in place, brace the unit, press down and gently turn its clockwise to lock it into place. If too much force is used, the cartridge may be difficult to remove! Replace the HEPA filter access panel. Re-install safety screw(s) into HEPA filter access panel." Again tools and fasteners are required and should be avoided.

SUMMARY OF THE INVENTION

A tool-less air filtration device having a two-piece housing with a filter. The tool-less air filtration device is simple, is totally tool-less for removing and replacing HEPA air filters and cleaning the interior of the air filtration device, and allows for quick, seamless filter changes in the field, while providing the convenient accessibility required to fully clean all surfaces of the unit.

DETAILED DESCRIPTION OF THE INVENTION

Figure 1A:
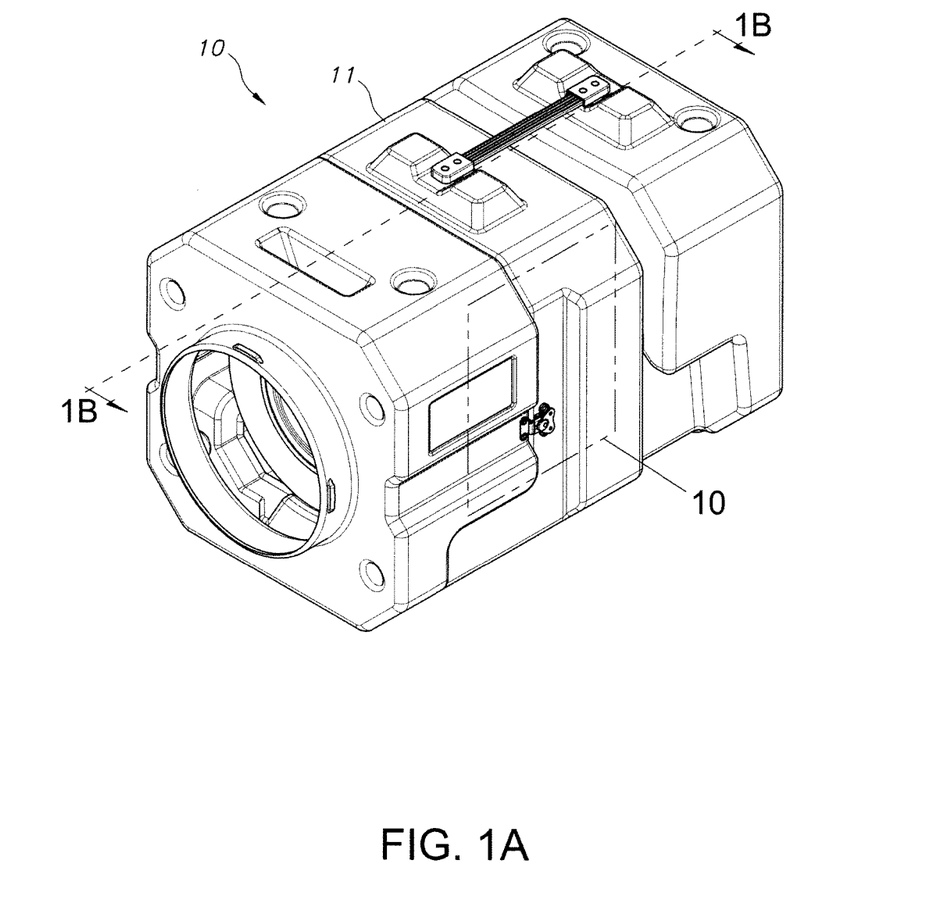
FIG. 1A is an assembled tool-less air filtration device.

A HEPA air filtration system 10 has a housing 11 containing a fan (or impeller) and motor 12 or equivalent device that pushes or pulls air through (a) an inlet opening 14 of a HEPA air filtration system, (b) a HEPA air filter 16 and (c) an outlet opening 18 of the HEPA air filtration system as illustrated at FIGS. 1A and B. The air is directed (1) into the HEPA air filtration system (a) directly—ambient air immediately surrounding the HEPA air filtration system 10 as illustrated at FIG. 2A—into the inlet opening 14 in the HEPA air filtration system 10 or (b) through ducts 20, conduits or equivalents thereof—ambient air located in a different room, different location in the air filtration system's room, or air altering device (for example and not limited to an air conditioner or air heating device) 22 as illustrated in FIG. 2B—interconnected to the inlet opening 14 in the HEPA air filtration system 10; (2) out of the HEPA air filtration system (a) directly from the outlet opening 18 into the area immediately surrounding the HEPA air filtration system 10 as illustrated at FIG. 2A or (b) through ducts 24, conduits or equivalents thereof into a different room, a different location in the room, or air altering device (for example and not limited to an air conditioner or air heating device) 26 as illustrated in FIG. 2C from the outlet opening 18 in the HEPA air filtration system and (3) combinations thereof. Depending on how the air is directed into the HEPA air filtration system, the air can be obtained from a room, a building, an air altering device or even an outdoor environment.

Figure 1B:
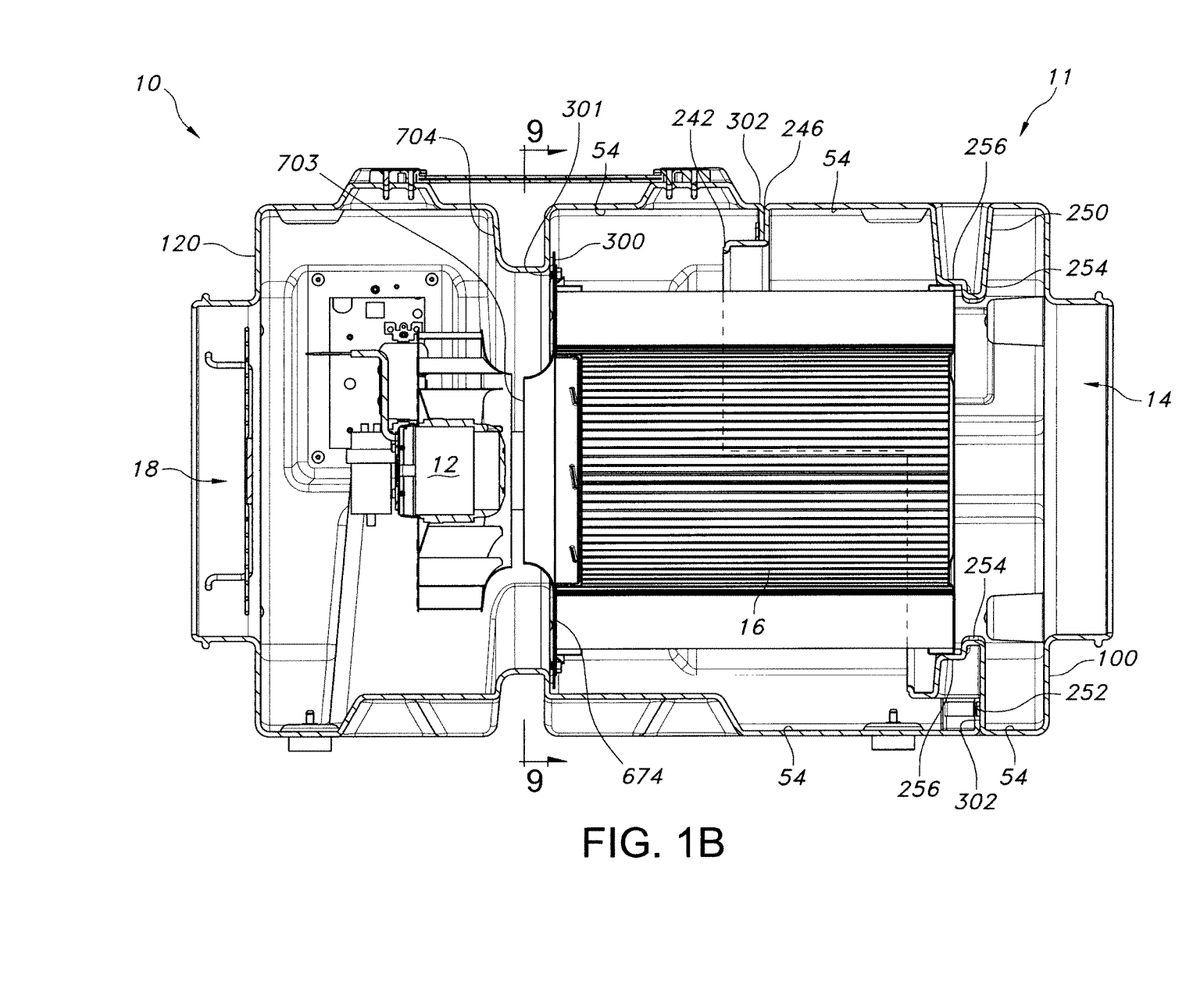
FIG. 1B is a cross-section of FIG. 1A taken along the lines 1B-1B.
Figure 2A:
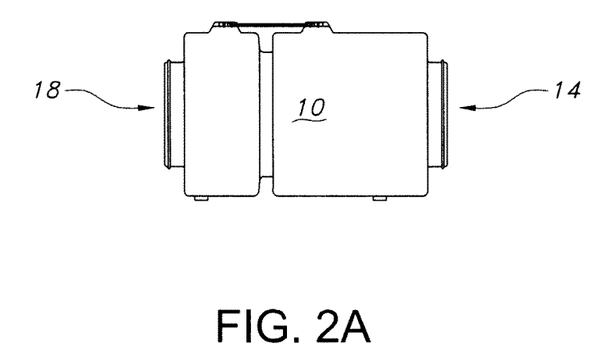
FIG. 2A-C are various embodiments of how the tool-less air filtration device can be used.
Figure 2B:
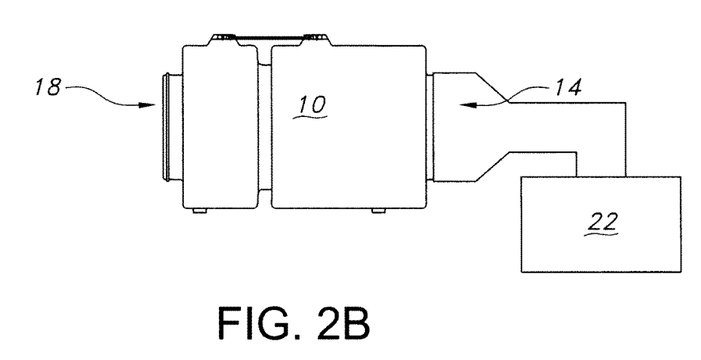
Figure 2C:
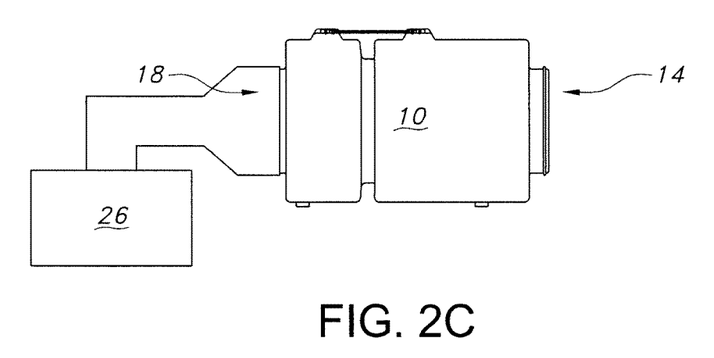
Figure 3:
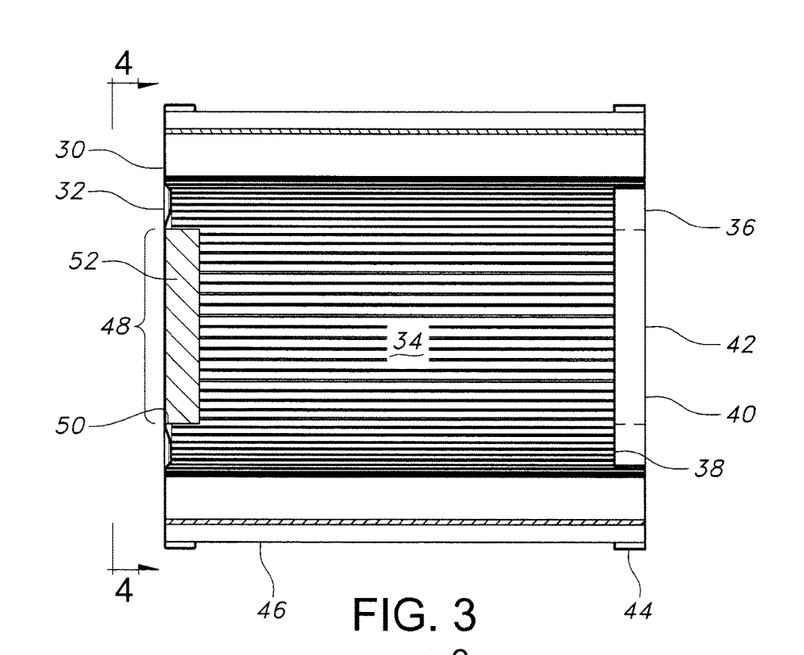
FIG. 3 is an enlarged cross-sectional view of a HEPA air filter.

A preferred embodiment of the present invention uses a threaded HEPA filter 16 as illustrated at FIGS. 1B and 3. The threaded HEPA filter 16 has a threaded end cap 30 at a distal end 32, a HEPA filter cartridge section 34 and a proximal end cap 36 at a proximal end 38. The proximal end cap 36 has (a) a cover section 40 that exposes a first stage filter 42 and covers the remainder of the HEPA filter cartridge section's proximal end 38; and (b) a support section 44 that extends a limited distance along the HEPA filter cartridge section's exterior surface 46 toward the distal end 32.

Figure 4A:
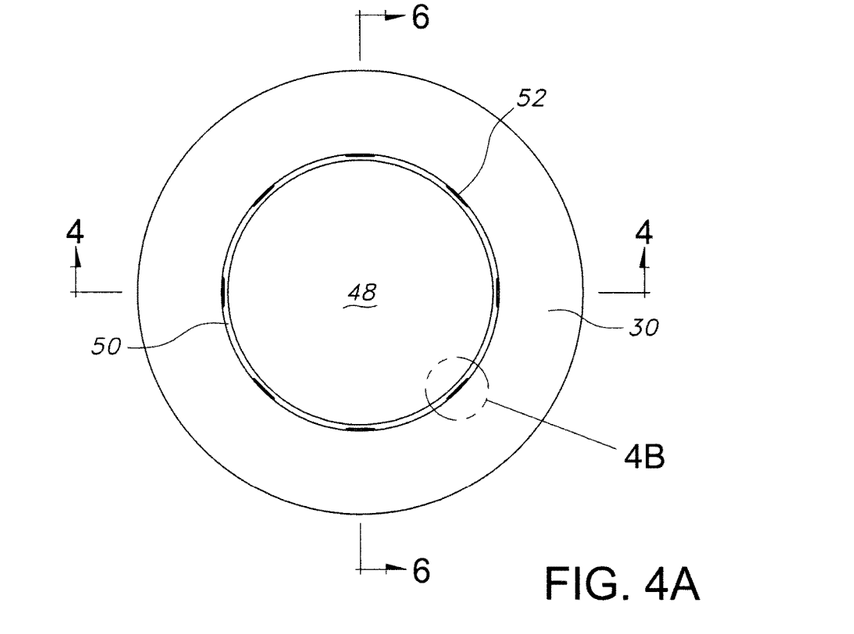
FIG. 4A is a view of FIG. 3 taken along the lines 4-4.
Figure 4B:
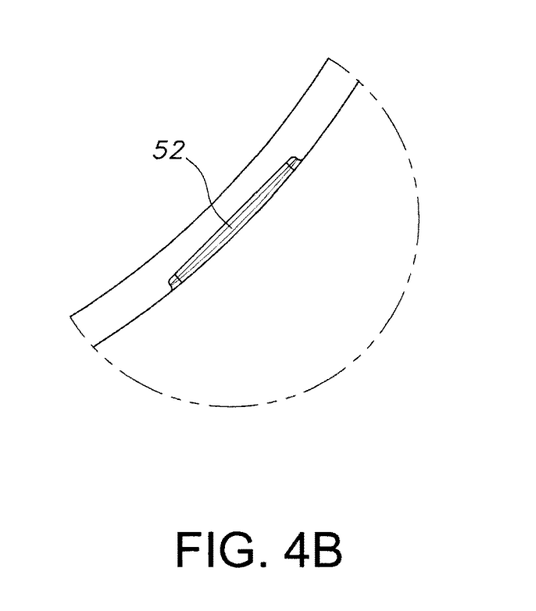
FIG. 4B is a close-up view of FIG. 4A at circle identified as 4B.
Figure 5:
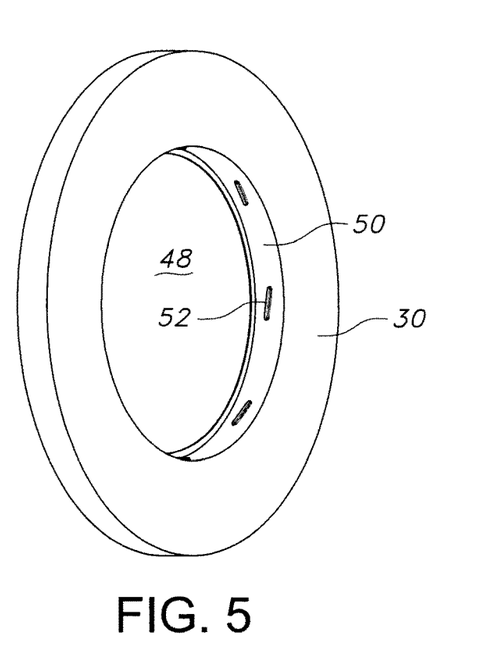
FIG. 5 is an isometric view of FIG. 4.
Figure 6A:
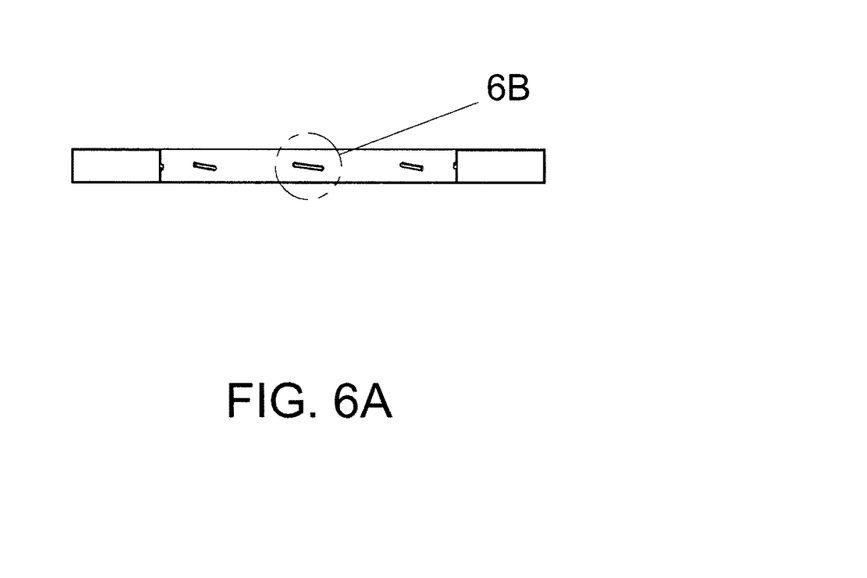
FIG. 6A is a cross-sectional view of FIG. 4 taken along the lines 6-6.
Figure 6B:
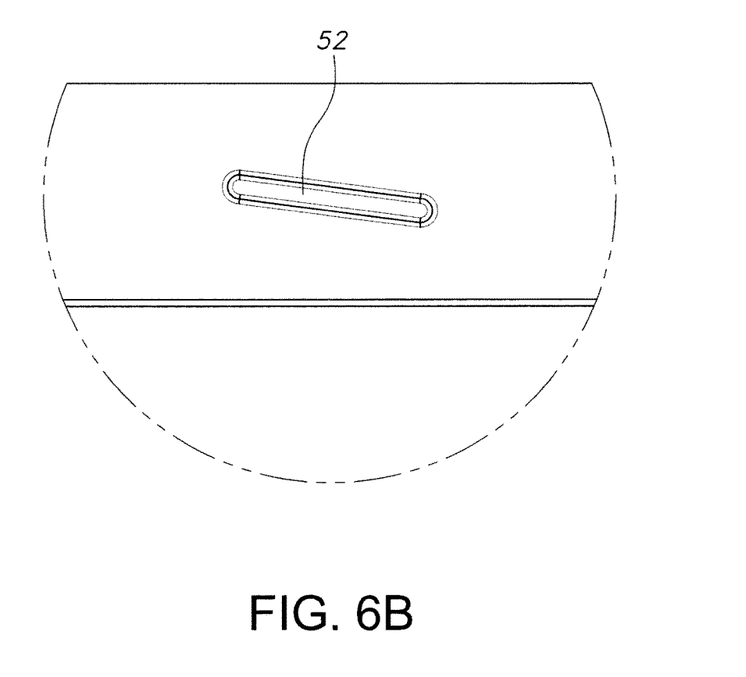
FIG. 6B is a close-up view of FIG. 6A taken from circle 444.

The threaded end cap 30, as illustrated at FIGS. 4 and 5, has an aperture 48. The aperture 48 is defined by a female wall 50 extending in the direction toward the proximal end cap 38. The female wall 50 has, as best illustrated at FIGS. 5, 6A and 6B, threads 52. The threads are preferably 8 evenly spaced threads to provide redundancy in the seal and allow the filter to installed in multiple orientations without the need for additional tools. The high number of threads also increases the force with which the o-ring is compressed, ensuring all contaminated air is forced to pass through the filter media. Matching threads 52 allow the filter to pull the filter onto or into the bulkhead and compress the o-ring 301.

The current invention is directed to a specific housing 11 embodiment of a HEPA air filtration system 10 that is tool-less. As previously identified, a tool-less HEPA air filtration device is desirable, for example, to change HEPA filters 16 and clean the air filtration device's interior surfaces 54 without using tools to open the housing 11 to remove or insert HEPA filters. HEPA air filtration devices use tools— for example and not limited to screw-drivers or wrenches in combination with fasteners such as screws or nuts & bolts—because those fasteners allegedly secure the components in place so the air released from the HEPA air filtration system 10 has air contaminants of less than 0.3 microns. If there is a leak in the HEPA air filtration system, then the HEPA air filtration system will most likely not obtain those desired results. Tools are a conventional method to make sure the HEPA air filtration system does not have undesired leaks in the HEPA air filtration system. Tools, however, make it difficult to efficiently, for example, change HEPA air filters or clean the air filtration device's interior surface. The current invention is directed to a tool-less HEPA air filtration system or device.

Reverting to FIG. 1B, that figure illustrates a tool-less air filtration device 10 having a two-piece housing 11 with the threaded HEPA filter 16. The two-piece housing 11 has an inlet end 100, or alternatively referred to as a filter access panel, with the inlet opening 14 and an exhaust end 120, alternatively referred to as the main housing, with the outlet opening 18.

Figure 7:
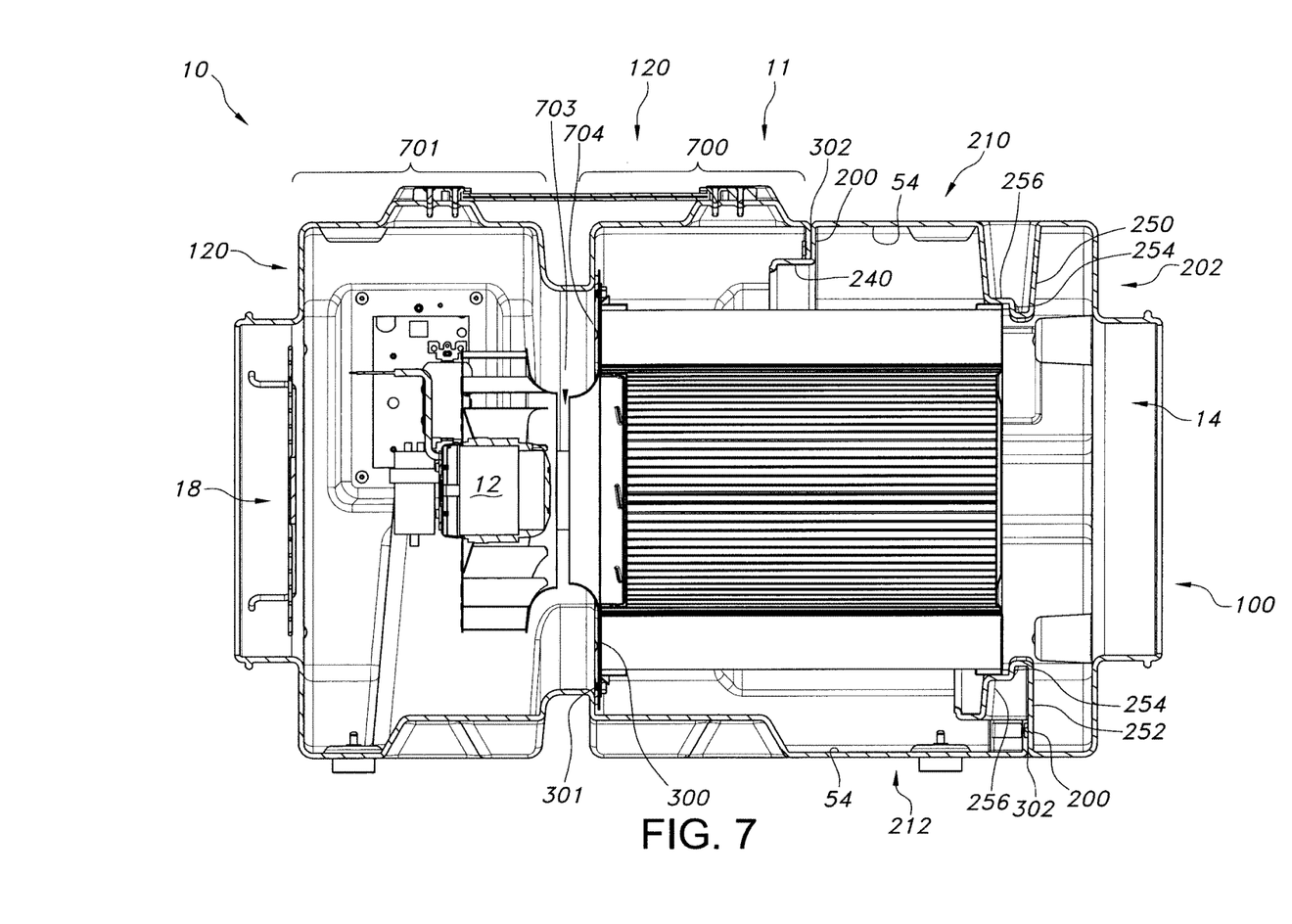
FIG. 7 is an alternative view of FIG. 1B.
Figure 8:
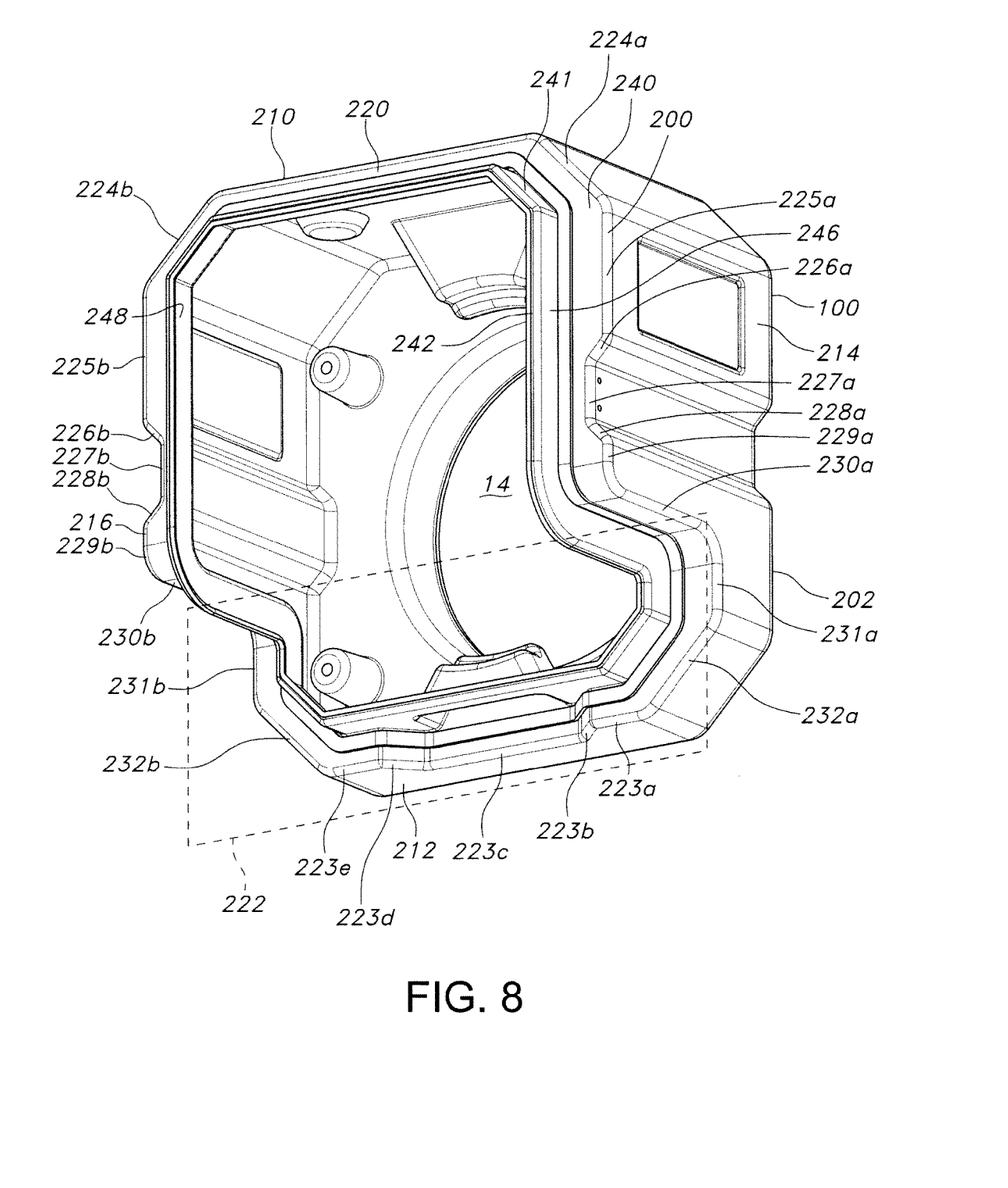
FIG. 8 is an isometric view of FIG. 1A taken along the lines 8-8.

The inlet end 100 and the exhaust end 120 are preferably metal or plastic and formed into a desired shape. The inlet end 100 appears to have a plurality of walls that form an interconnect surface 200, and a base surface 202, as illustrated at FIGS. 7 and 8. The air inlet 14 is positioned on the base surface 202. The interconnect surface 200 has a polygonic, serpentine-like shape having a generic top surface 210, a bottom surface 212, a first side surface 214 and a second side surface 216. As illustrated at FIG. 8, the top surface 210 has a straight or essentially straight exterior edge surface 220. The bottom surface 212 has a portion of a first tongue receiving exterior edge area and a second tongue receiving area exterior edge area, collectively referred to as tongue receiving area 222 as illustrated at FIG. 8.

Along the bottom surface 212 and starting from the first side surface 214 is a portion of the first tongue receiving area having a first straight edge surface 223a positioned (a) a first predetermined distance from the base surface 202 and (b) at the juncture with the first side surface 214. The first straight edge 222a extends a first predetermined length toward the second side surface 216. At its distal terminus—relative to the first side surface 216—, the first straight edge surface 223a bevels into a second straight edge surface 223b. The second straight edge surface 223b is angled (a) downward toward the base surface 202 and (b) toward the second side surface 216 and extends a second predetermined length. At its terminus, the second straight edge surface 223b bevels into a third straight edge surface 223c. The third straight edge surface 223c (a) is positioned a second predetermined distance from the base surface 202, wherein the second predetermined distance is less than the first predetermined distance, and (b) extends a third predetermined length. At its terminus, the third straight edge surface 223c bevels into a fourth straight edge surface 223d. The fourth straight edge surface 223d is a mirror image of the second straight edge surface 223b, and bevels into a fifth straight edge surface 223e. Likewise, the fifth straight edge surface 223e is a mirror image of the first straight edge surface 223a. Also, the top surface's exterior edge 220 is positioned a third predetermined distance from the base surface 202, wherein the third predetermined distance is greater than the first predetermined distance.

The first side surface 214 and the second side surface 216 are mirror images of each other. Each has nine distinct straight or essentially straight exterior edge surfaces—angled upper, top upper, angled upper connection area, connection area, angled lower connection area, bottom upper, transition, lower and angled lower.

Starting at the top surface 220 toward the bottom surface 212 is as follows:

Each angled upper surface edge surface 224a, 224b extends at an outward angle from the top surface's exterior edge 220 toward the bottom surface 212 for a fourth predetermined length and at the third predetermined distance from the base surface 202. At its terminus in relation to the bottom surface 212, each angled upper surface edge 224a, 224b bevels into a top upper edge surface 225a, 225b. Each top upper edge surface 225a, 225b extends vertically toward the bottom surface 212 for a fifth predetermined length and maintains the third predetermined distance from the base surface 202. At its terminus, each top upper edge surface 225a, 225b bevels into the angled upper connection area edge surface 226a, 226b. Each angled upper connection area edge surface 226a, 226b extends at an inward angle toward the bottom surface 212 for a sixth predetermined length and, at its terminus, bevels into the connection area edge surface 227a, 227b. Each connection area edge surface 227a, 227b (a) extends vertically toward the bottom surface 212 for a seventh predetermined length, (b) maintains the third predetermined distance from the base surface 202, and (c) at its terminus, bevels into the angled lower connection area edge surface 228a, 228b. Each angled lower connection area edge surface 228a, 228b extends at an outward angle toward the bottom surface 212 for the sixth predetermined length and, at its terminus, bevels into bottom upper edge surface 229a, 229b. Each bottom upper edge surface 229a, 229b extends vertically toward the bottom surface 212 for an eighth predetermined length and maintains the third predetermined distance from the base surface 202. At its terminus, each bottom upper edge surface 229a, 229b bevels into the transition edge surface 230a, 230b.

Each transition edge surface 230a, 230b extends vertically toward the base surface 202 for a length that is equal to the first predetermined distance from the base surface 202, maintains its distance from the bottom surface 212, and, at its terminus, bevels into the lower edge surface 231a, 231b. Each lower edge surface 231a, 231b extends vertically toward the bottom surface 212 for a tenth predetermined length, maintains the first predetermined distance from the base surface 202 and, at its terminus bevels into the angled lower edge surface 232a, 232b. Each angled lower edge surface 232a, 232b extends inward toward the bottom surface 212 for an eleventh predetermined length and bevels into the first and fifth straight edge surfaces 223a, 223e respectively. The edge surfaces in this paragraph—230a,b to 232a,b in addition to the edge surfaces 223a and 223e form the first tongue receiving area.

Each exterior edge surface 220, 223a-e, 224a,b, 225a,b, 226a,b, 227a,b, 228a,b, 229a,b, 230a,b, 231a,b, and 232a,b has a restraining contact wall surface 240 that extends into the inlet end's interior. The restraining contact wall surface 240 extends horizontally relative to the base surface 202 from exterior edges 220, 223a, 223e, 224a,b, 225a,b, 226a,b, 227a,b, 228a,b, 229a,b, 231a,b, and 232a,b. The restraining contact wall surface 240 extends vertically relative to the base surface 202 from exterior edge surfaces 230a,b. In any case, the restraining surface 240 extends into the inlet end's interior at a predetermined length except at surfaces 223b-d. Edges surfaces 223b-d has the restraining contact wall surface 240 that also extends to form a second saddle 252 which will be described later. The restraining contact wall surface 240 normally has a uniform length except at exterior edges 226a,b, 227a,b and 228a,b. The restraining surface's 240 length ranges from for example and not limited to 0.5 to 2 centimeters.

A friction connection surface 242 protrudes toward the exhaust end 30 for a predetermined distance, for example and not limited to 0.5 to 2 centimeters, from a distal end 241 of the restraining contact wall surface 240. The friction connection surface 242 has an exterior surface 246 and an interior surface 248. The friction connection surface 242 and restraining contact wall surface 240 contact an interconnection surface 302, which will be described later. Preferably, an inlet gasket 244 is positioned where the friction wall's exterior surface 236 protrudes from the restraining wall 230.

A first saddle 250 projects downward into the inlet end's interior surface from the top surface 210 and the second saddle 252 projects upward into the inlet end's interior surface the bottom surface 212. The first and second saddles 250, 252 have a backstop section 254 and a compression section 256. The first and second saddles 250, 252 protrude into the inlet end's interior surface so the compression section 256 contacts the EasyTwist™ brand threaded HEPA filter's side section 44 and the backstop contacts the EasyTwist™ brand threaded HEPA filter's top section 40 when the EasyTwist™ brand threaded HEPA filter 16 is properly positioned in the inlet end 100. In particular, the compression section 256 is designed to apply compressive forces to the side section 44.

Figure 9A:
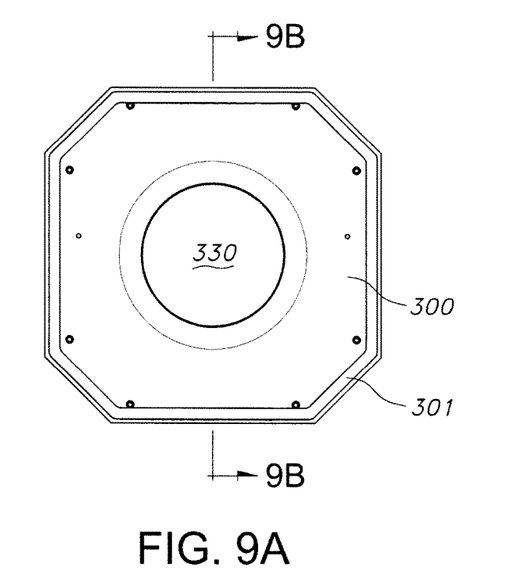
FIG. 9A is a view of FIG. 1B taken along the lines 9-9.
Figure 9B:
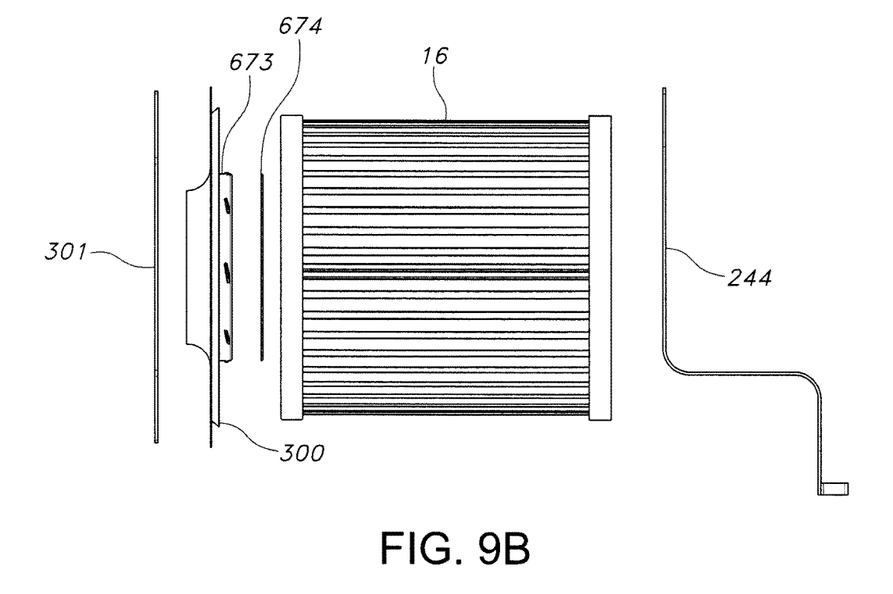
FIG. 9B is a view of FIG. 9A taken along the lines 9B-9B.

The exhaust end 120 has a filter area 700, a fan area 701 and the interconnection surface 302. A bulkhead 300 with a bulkhead gasket 301, as illustrated at FIGS. 9a and b, are securely positioned, by for example and not limited to fasteners and/or friction fit, between the filter area 700 and the fan area 701 as illustrated at FIGS. 1 and 7. Positioned between the filter area 700 and the fan area 701 is a partial wall 704 with an aperture 703. The aperture 703 permits air to be pushed or pulled through the HEPA filter 16 and exhaust through the respective outlet opening 18. When the exhaust end 120 and the inlet 100 are properly joined together, the interconnection surface 302 contacts the restraining surface 240 and the inlet gasket 244. Likewise, the interconnection surface's interior surface 304 contacts the friction surface's 242 exterior surface 246.

Figure 10:
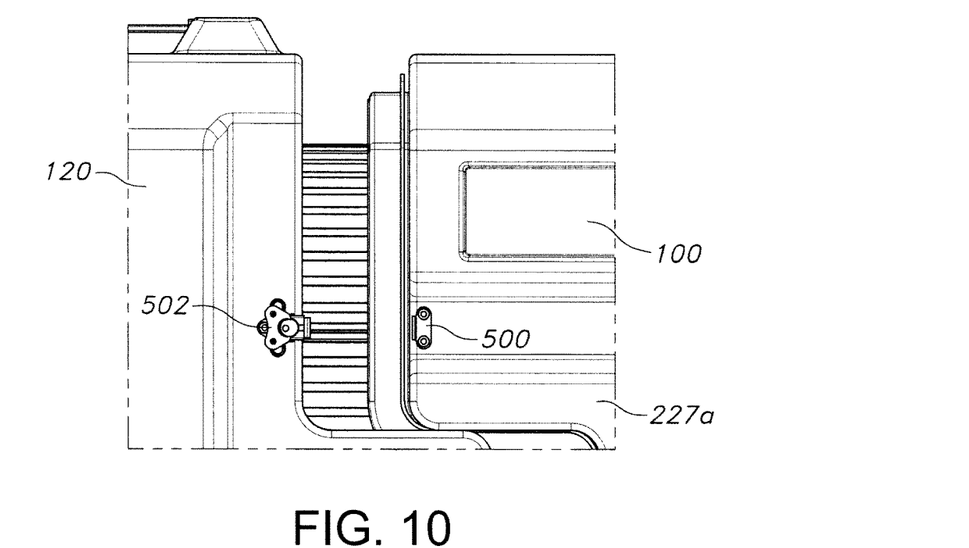
FIG. 10 is a view of FIG. 1A taken from box 10.
Figure 11:
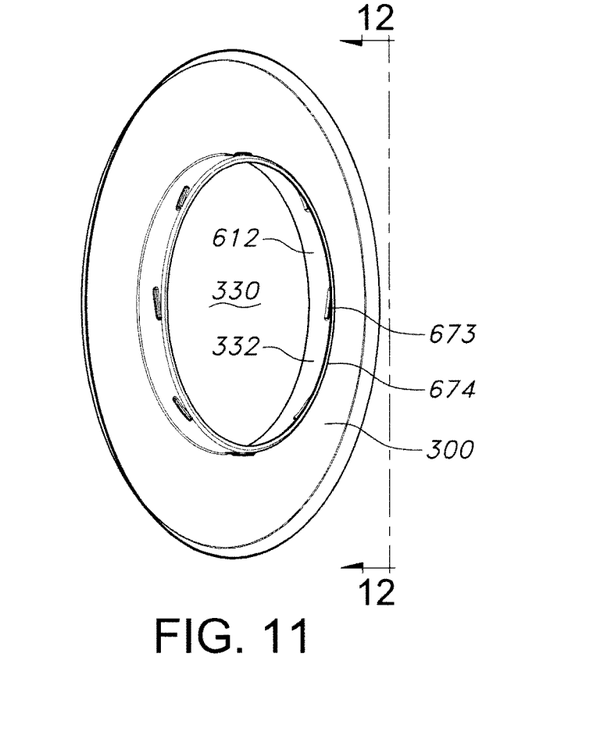
FIG. 11 is an isometric view of FIG. 1B taken along the lines 11-11.
Figure 12A:
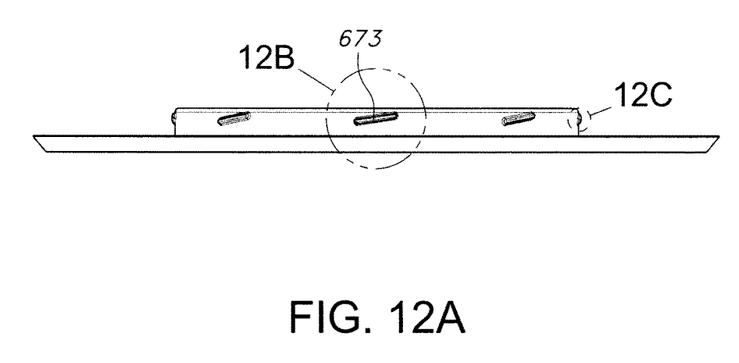
FIG. 12A is a view of FIG. 11 taken along the lines 12-12
Figure 12B:
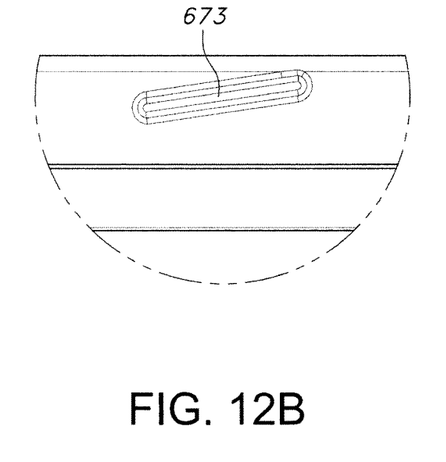
FIGS. 12B and 12C are close up views of FIG. 12A as identified respectively as 12B and 12C.
Figure 12C:
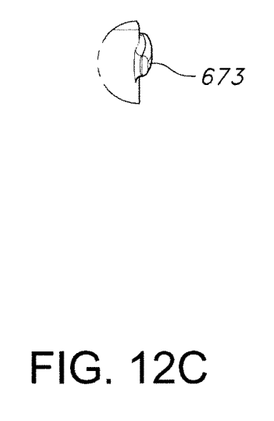

A hook 500 is positioned at or near the connection area edge 227a, 227b as illustrated at FIG. 10. The hook 500 is designed to interconnect to an extendable latch 502 positioned on the exhaust end 120 near the interconnection surface 302. The extendable latch 502 can be a surface mount twist latch and strike. In many instances, the surface mount twist latch and strike has a spring loaded anchor plate that automatically compensates for up to 2.7 mm of misalignment. It is an easy operation that is actuated by fingertip pressure on a wing of a 180° turn. When the wing is turned, the extendable latch pulls the inlet end 100 toward the exhaust end 120 to compress (a) the HEPA air filter's proximal end cap 36 into the first and second saddles 250, 252; (b) the interconnection surface 302 against the restraining surface 240 and the inlet gasket 244, and (c) the interconnection surface's interior surface 304 against the friction surface's 242 exterior surface 246 to ensure all sides of the housing sections 100,120 and the threaded HEPA air filter are restrained from moving during transport and/or operation. Examples of such latches and hooks are available at TCH of Buffalo, N.Y. and the latch is identified as TCH Item #501-2481800.

The bulkhead 300 positioned at exhaust end 120 has an opening 330 and positioned around that opening 330 is a threaded adaptor system 332 for receiving the threaded HEPA air filter 16.

The threaded adaptor system 332 has a filter connection wall 612 extending in the direction toward the inlet end 100. The filter connection wall 612 has thread 673. As identified above, the threaded HEPA filter 16 has the threaded end cap 30. There are 8 evenly spaced matching threads 52. The matching threads 52 allow the HEPA air filter 16 to pull the filter into the bulkhead's threads 673 and compress a filter o-ring 674—positioned at the junction between the filter connection wall 612 and the bulkhead 300. to obtain a secure fit. The bulkheads threads 673 as illustrated at FIGS. 11, 12A, 12B, and 12C. The bulkhead threads 673 are pitched at between 5 to 10°, preferably between 7 to 8°, and most preferably at 7.5° to pull the filter 16 down and ensure a tight seal as well as preventing the HEPA filter 16 from falling off. The threads 673 are 0.1 inches tall and rounded to ensure easy fitting while retaining the HEPA filter by negating side to side motion. The threads 673 also have rounded edges to provide a lead-in for the filter 16. The threads 673 are also about 1 inch long to provide good retention force and ensuring a proper fit. The combination of the shape, number, spacing and angle of the threads for the threaded HEPA filters 16 and the bulkhead threads 673 as identified above make filter changes easy, quick and provide good retention force and ensure a proper fit without using tools.

The opening 330 directs air out of the HEPA air filter 14 toward the outlet 18 to provide the desired air quality after the air passes through the HEPA air filter 14.

The HEPA filter 16 is, however, not sufficiently stabilized within the exhaust end 120. To stabilize the HEPA filter 16, until the HEPA air filter's must be properly interconnected with the first and second saddles 250, 252 as identified above.

The above-identified two-piece housing 12 need not have the described exterior surface. In particular, there need not be twenty-four exterior edges as described above, instead there could be ten to thirty exterior edge surfaces. The above-identified twenty-four exterior edge design is preferred since it provides the desired stable structure and ease in securing, releasing and aligning the two-piece housing. Other configurations do not provide the desired stability. The fan area 701 can be positioned on the inlet end to push air through the two-piece housing 11 and HEPA air filter 16.

The method to use this tool-less air filtration device 10 calls for unlocking the hand-operated latches to permit the filter access panel 100 to easily separate from the main housing section 120 without the need for additional tools. Rotating the threaded tool-less HEPA air filter counter-clockwise quickly and easily releases the air filtration device's HEPA air filter. The HEPA air filter can then be easily removed from the main housing section 30. Once removed, all interior surfaces of the two part housing are open and accessible for easy, quick and through cleaning of the air filtration device 10 and/or a replacement threaded tool-less HEPA air filter can be added without any tools.

The tool-less air filtration device is simple, is totally tool-less, and allows for quick, seamless filter changes in the field, while providing the convenient accessibility required to fully clean all surfaces of the unit.

The invention claimed is:
1. A tool-less air filtration system comprising:
   a main housing having
   (a) an air pulling section with a first set of walls, the first set of walls have a first exterior surface and a first interior surface, the first interior surface defines a fan cavity, and both the first exterior surface and the first interior surface define an air outlet aperture at the main housing's distal end and a section aperture and (b) an air filter section having a second set of walls, the second set of walls have a second exterior surface and a second interior surface, the second set of walls (a) extend from the exterior surface of the first set of walls that define the section aperture and (b) define an interconnection surface at the main housing's proximal end;

the interconnection surface has a first tongue section, a first latch section, and a second latch section;

the interconnection surface and the first interior surface at and near the main housing's proximal end has polygonic shape having 10 to 30 sides;

the second interior surface defines a first portion of a filter cavity;

a bulkhead positioned on the exterior surface of the first set of walls that define the section aperture; a first gasket is positioned between the bulkhead and the first set of walls that define the section aperture, the bulkhead has a filtered air aperture, a filter connection wall protrudes from the bulkhead into the filter cavity, encircles the section aperture, and has threads on the filter connection wall's exterior surface;

the threaded protrusion is capable to receive a threaded, distal end of a HEPA air filter;

a filter access panel having a third set of walls that define an air inlet aperture at the proximal end of the tool-less air filtration system, a second portion of the filter cavity, and a friction connection surface;

the friction connection surface has a contact wall, a friction wall protruding from the contact wall toward the first portion of a filter cavity, and a gasket positioned at or near the juncture between the contact wall and the friction wall;

the contact wall releasably contacts the interconnection surface and the friction wall releasably friction fits to the first interior surface at and near the main housing's proximal end;

a first saddle and a second saddle, each saddle has a backstop section and a compression section, the backstop section is positioned to contact the HEPA air filter's proximal end when the HEPA air filter is properly positioned in the filter cavity and the compression section is positioned to apply a compression contact to the HEPA air filter when the HEPA air filter is properly positioned in the filter cavity in order to inhibit the HEPA air filter from becoming displaced during operation or movement;

a first tool-less extendable latch securely attached to the exterior surface of the first latch section, a first hook securely attached to the third set of walls' exterior surface, a second tool-less extendable latch securely attached to the exterior surface of the second latch section, a second hook securely attached to the third set of walls' exterior surface wherein the first extendable latch can releasably attach to the first hook and the second extendable latch can releasably attach to the second hook when the main housing and the filter access panel are to be connected to form the tool-less air filtration system that forces air entering the air inlet aperture to proceed through the HEPA filter prior to being exiting the air outlet aperture.

2. The tool-less air filtration system of claim 1 wherein the HEPA air filter is cylindrical shaped.

3. The tool-less air filtration system of claim 1 wherein the polygonic shape has 24 sides.

4. The tool-less air filtration system of claim 1 further comprising a second tongue section extending from the first tongue section.

5. The tool-less air filtration system of claim 4 wherein the second tongue section extends up to or beyond the backstop of the first or second saddle.

* * * * *